(12) United States Patent
MacGregor et al.

(10) Patent No.: US 9,383,475 B2
(45) Date of Patent: Jul. 5, 2016

(54) GEOPHYSICAL SURVEYING

(75) Inventors: Lucy MacGregor, Edinburgh (GB); Peter Harris, Oslo (NO)

(73) Assignee: ROCK SOLID IMAGES, INC., Houston, TX (US)

(*) Notice: Subject to any disclaimer, the term of this patent is extended or adjusted under 35 U.S.C. 154(b) by 2438 days.

(21) Appl. No.: 12/135,729

(22) Filed: Jun. 9, 2008

(65) Prior Publication Data

US 2009/0306895 A1 Dec. 10, 2009

(51) Int. Cl.
*G06G 7/48* (2006.01)
*G01V 11/00* (2006.01)
*G01V 3/12* (2006.01)
*G01V 3/38* (2006.01)

(52) U.S. Cl.
CPC ........ *G01V 11/00* (2013.01); *G01V 3/12* (2013.01); *G01V 3/38* (2013.01)

(58) Field of Classification Search
CPC ............ G01V 11/00; G01V 3/12; G01V 3/38
USPC ................................ 703/10; 702/6, 7, 13, 14
See application file for complete search history.

(56) References Cited

U.S. PATENT DOCUMENTS

| | | | |
|---|---|---|---|
| 7,328,107 B2 * | 2/2008 | Strack et al. | 702/14 |
| 7,373,251 B2 * | 5/2008 | Hamman et al. | 702/14 |
| 2008/0319674 A1 * | 12/2008 | Dai et al. | 702/6 |
| 2009/0204327 A1 * | 8/2009 | Lu et al. | 702/7 |
| 2009/0306900 A1 * | 12/2009 | Jing et al. | 702/13 |

FOREIGN PATENT DOCUMENTS

| | | | |
|---|---|---|---|
| GB | 2382875 A | 6/2003 |
| GB | 2411006 A | 8/2005 |
| GB | 2423370 A | 8/2006 |

OTHER PUBLICATIONS

Harris, P. et al. (2007), "Enhancing the Resolution of CSEM Inversion Using Seismic Constraints," 77th Annual International meeting, SEG Expanded Abstracts, pp. 604-608.*

Chen, J. and Hoversten, G. M.; "Estimating reservoir parameters from seismic and electromagnetic data using stochastic rock-physics models and Markov chain Monte Carlo methods"; SEG/Houston 2005 Annual Meeting; pp. 542-545.

(Continued)

*Primary Examiner* — Kamini S Shah
*Assistant Examiner* — Juan Ochoa
(74) *Attorney, Agent, or Firm* — Locke Lord LLP (57) ABSTRACT

A method of analyzing controlled source electromagnetic (CSEM) survey data to determine probability density functions (PDFs) for values of an electromagnetic parameter at locations in a subterranean region of interest is provided. Structural features in the subterranean strata are identified, e.g. from seismic survey data. An initial PDF for values of the electromagnetic parameter is then assigned to each feature. Models specifying values for the parameter in each structural feature are generated by sampling the PDFs. A subset of the models are deemed acceptable based on an acceptance criterion. The PDF for each feature is modified based on values for the parameter in the subset of accepted models to generate replacement PDFs for each feature. The process may be iterated a number of times to generate final PDFs for values of the electromagnetic parameter in the structural features identified in the subterranean region of interest.

21 Claims, 7 Drawing Sheets

(56) References Cited

OTHER PUBLICATIONS

Gunning, J., et al.;"Resolution and uncertainty in 1D CSEM inversion: A Bayesian approach and open-source implementation", Geophysics, vol. 75, No. 6; Nov.-Dec. 2010; pp. F151-F171.

Hou, Z., et al.; "Reservoir-parameter identification using minimum relative entropy-based Bayesian inversion of seismic AVA and marine CSEM data"; Geophysics, vol. 71, No. 6; Nov.-Dec. 2006; pp. O77-O88.

Hordt, A. and Strack, K.M. "Reservoir Surveying Through The Combined Use of Seismic and Electromagnetic Methods." (English Translation from the Original German), Interpretation Strategies in Exploration and Production, 14th Mintrop Seminar, Arnsberg-Neheim, May 3-6, 1994.

Hordt, A. and Strack, K.M. "Reservoirerkundung Durch Kombinierten Einsatz Seismischer Und Elektromagnetischer Verfahren." Interpretations—Strategien in Exploration and Produktion, 14th Mintrop Seminar, Arnsberg-Neheim, May 3-6, 1994.

Hoversten, G., Cassassuce, F., Gasperikova, E., Newman, G., Chen, J., Rubin, Y., Hou, Z. and Vasco, D. "Direct reservoir parameter estimation using joint inversion of marine seismic AVA and CSEM data." Geophysics, May-Jun. 2006, vol. 71, No. 3, p. C1-C13, Society of Exploration Geophysicists.

Constable, S. and Weiss, C. "Mapping thin resistors and hydrocarbons with marine EM methods: Insights from 1D modeling." Geophysics, Mar.-Apr. 2006, vol. 71, No. 2, p. G43-G51, Society of Exploration Geophysicists.

MacGregor, L., Sinha, M. and Constable, S. "Use of Marine Controlled Source Electromagnetic Sounding for Sub-Basalt Exploration." EAGE 61st Conference and Technical Exhibition, Jun. 7-11, 1999, Helsinki, Finland.

MacGregor, L., Andreis, D., Tomlinson, J. and Barker, N. "Controlled-source electromagnetic imaging on the Nuggets-1 reservoir." The Leading Edge, Aug. 2006, p. 984-992.

Harris, P. and MacGregor, L. "Determination of reservoir properties from the integration of CSEM and seismic data." First Break, Nov. 2006, vol. 24, p. 15-21, EAGE.

Kirkpatrick, S., Gelatt, C.D., and Vecchi, M.P. "Optimization by Simulated Annealing" Science, New Series, vol. 220, No. 4598, p. 671-680, May 13, 1983.

* cited by examiner

PRIOR ART

FIG. 11

PRIOR ART

GEOPHYSICAL SURVEYING

BACKGROUND ART

The invention relates to geophysical surveying. More particularly the invention relates to geophysical surveying for resistive and/or conductive bodies. Such bodies might, for example, comprise oil, gas, methane hydrates etc. or other hydrocarbon reserves, or subterranean salt bodies.

Seismic survey techniques are well known and provide well established methods for identifying structural features in subterranean rock strata, e.g., distinct layers and potential fluid reservoirs. Seismic techniques primarily distinguish between different subterranean structures on the basis of their different mechanical properties. Thus, for example, in the context of hydrocarbon exploration, seismic techniques are generally able to readily identify relatively low-density voids which might potentially contain hydrocarbon within the rock strata. Seismic techniques are able to identify such structures with relatively good spatial resolution. For example, it would not be unusual for seismic techniques to identify structural features, such as layer boundaries in subterranean strata, at a spatial resolution on the order of 10 m or so to depths of over 1 km. However, a drawback of seismic techniques is that while they are able to readily identify rock structures which might potentially contain, e.g., hydrocarbon (hydrocarbon reservoirs), the techniques are often unable to distinguish what is in the reservoir (i.e., the pore fluids). This is especially so for pore fluids which have similar mechanical properties, such as oil and seawater. It is therefore generally necessary to employ other survey techniques to determine whether a reservoir that has been identified through seismic surveying contains oil, for example, or just aqueous pore fluids. One way of approaching this is to use electromagnetic survey techniques.

Electromagnetic (EM) techniques have become more established over recent years. EM techniques seek to distinguish oil- and water-filled reservoirs on the basis of their differing electrical properties. Thus a primary aim of EM surveying techniques is to provide estimates of electric resistivity at locations in the subterranean strata. One group of EM surveying techniques are the controlled-source EM (CSEM) survey techniques [1, 2, 3, 4, 5]. CSEM techniques involve transmitting an EM signal into the seafloor, generally using a horizontal electric dipole (HED) source (transmitter), and measuring the response at EM receivers (detectors) for a range of distances from the source (i.e. for a range of source-receiver offsets/separations). Since hydrocarbons are more resistive than seawater (e.g. hydrocarbon-bearing sediments typically have resistivities on the order of a few tens of $\Omega$m or higher versus a few $\Omega$m or so for water bearing sediments), the presence of a hydrocarbon-bearing reservoir will, in general, lead to stronger EM fields than would be the case if the reservoir contained only seawater. This is because the highly conducting seawater attenuates the component of the EM signal passing through the reservoir more than would be the case if the reservoir contained hydrocarbon. Conversely, the presence of relatively more conductive structures in the subterranean strata will, in general, lead to weaker EM fields seen at the detector. This is because of the increased attenuation of fields in the conductive structure. Thus an analysis of the electromagnetic fields measured during a CSEM survey, e.g., field amplitudes and phases, can in principle provide information on subterranean resistivity profiles, and hence likely reservoir content.

However, a drawback of CSEM survey techniques in some situations is that they provide results having relatively poor spatial resolution, especially compared to seismic techniques. This can arise because CSEM techniques are primarily sensitive to the transverse resistance of buried layers, i.e. for a simple 1D layered structure, the techniques are primarily sensitive to the product of the resistance of a geological layer multiplied by its thickness. Thus a thin resistive layer can give rise to a broadly similar response to a layer that is ten-times less resistive, but ten-times thicker.

Figure 1:
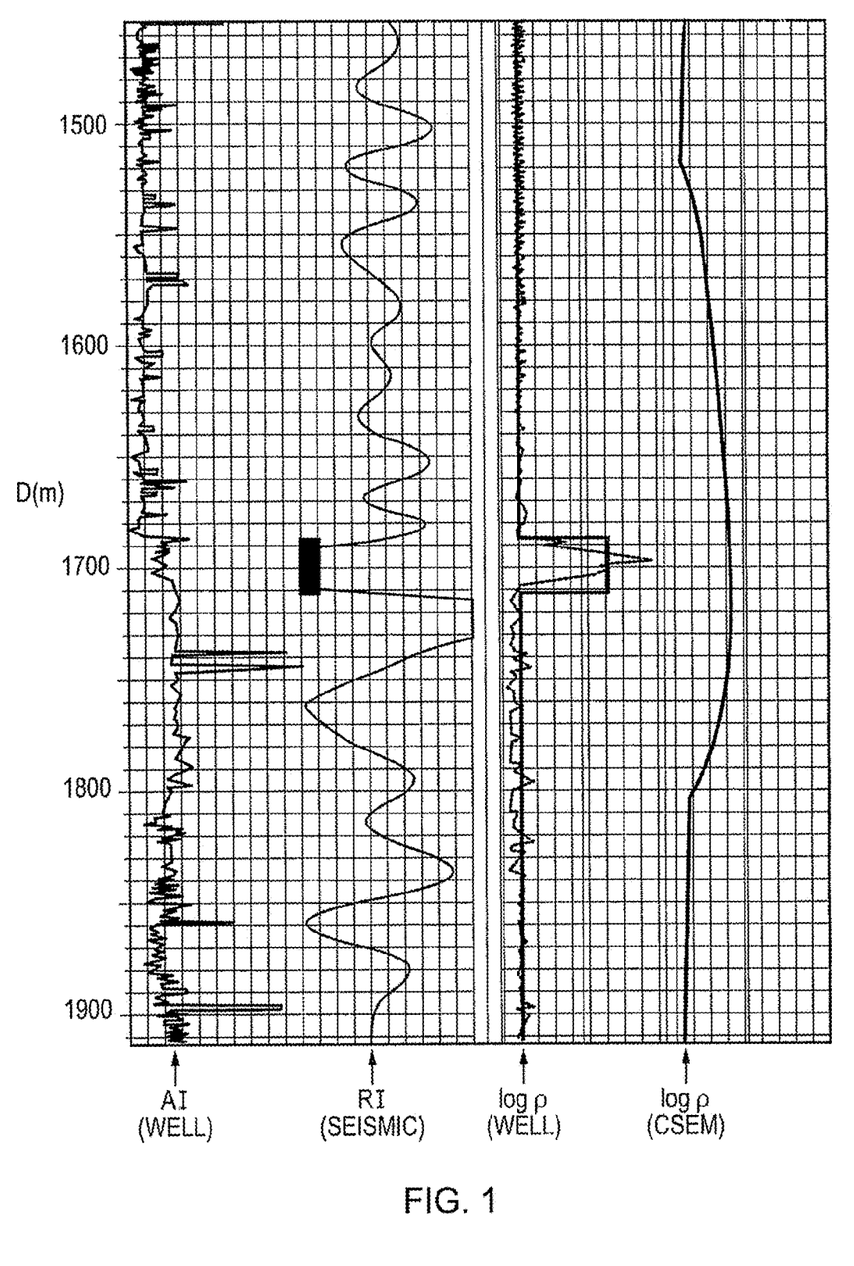
FIG. 1 schematically shows profiles for a number of geophysical properties obtained using well-log data, surface-based seismic techniques, and surface-based CSEM techniques.

FIG. 1 schematically shows profiles for a number of geophysical properties obtained using well-log data and surface-based seismic and CSEM techniques. The data are from a region in the Northern Underwater Gas Gathering Export and Treatment System (Nuggets-1) gas field in the North Sea (blocks 3/18c, 3/19a, 3/19b, 3/20a, 3124a, 3/24c and 3125a in the UK sector of the northern North Sea). Data are plotted as a function of depth (D) beneath the seafloor from around 1450 m to 1910 m at the location of a well from which the well-log data are obtained.

The left-most curve in the figure is identified as "AI (well)" and plots acoustic impedance from well-log data. This has values ranging (left to right) from around 3500 ms$^{-1}$ gm$^{-3}$ to 3680 ms$^{-1}$ gm$^{-3}$. The next curve is identified as "RI (seismic)". This plots the seismic relative impedance (converted from time to depth). This is determined at the well location using conventional surface seismic survey techniques. The data are uncalibrated, and the lowest values, at around D=1700 m, are clipped in the plot. The curve identified as "log $\rho$ (well)" plots resistivity as determined from well-log data. This has values ranging from around 0 to 7. The right-most curve is identified as "log $\rho$ (CSEM)" and this plots resistivity as determined using conventional surface CSEM survey techniques. Values for resistivity range from around 1 $\Omega$m to 12 $\Omega$m or so for this curve.

At the well location, the Nuggets-1 gas field includes a gas-saturated sand layer at a depth of around 1700 m, and having a thickness of around 25 m. The layer appears very clearly as an increase in the well-log resistivity ("log $\rho$ (well)") at this depth. This is because gas has a higher resistivity than the seawater which saturating the subterranean strata elsewhere in this profile. The gas-sand layer also appears, though less clearly, in the acoustic impedance ("AI (well)") determined in the well. The gas-sand layer is apparent here as a layer of intermediate acoustic impedance between shale layers above having lower acoustic impedance, and brine sands below having higher acoustic impedance.

Turning now to the surface derived data, it is clear from the CSEM derived vertical resistivity profile ("log $\rho$ (CSEM)") that the CSEM data are sensitive to the presence of the relative high-resistivity gas-sand layer. It is, however, identified with relatively poor spatial resolution. For example, the increase in the derived resistivity associated with the gas-sand layer is spread over a depth range that is around ten-times the thickness of the layer seen in the well-log data ("log $\rho$ (well)"). This results from the above-mentioned relatively poor spatial resolution of conventionally processed CSEM data. The surface-based seismic data ("RI (seismic)") more clearly show the presence of the gas sand layer as a clear reduction in seismic relative impedance over a range of around 20 to 30 m at the depth of the gas sand layer.

Thus FIG. 1 demonstrates the relatively poor spatial resolution associated with resistivity profiles derived from surface CSEM data, at least compared to the spatial resolution of seismic profiles obtainable from seismic surveying. It may be noted, however, that while the CSEM profile in FIG. 1 shows relatively poor spatial resolution, it nonetheless recovers the transverse resistance of the gas-sand layer well. That is to say, product of thickness and resistivity is relatively well resolved in the CSEM profile. This can be demonstrated by integrating over the increase in the CSEM profile associated with the layer (i.e., determining the area of the "bump" in the right-hand trace in FIG. 1), and dividing by the 25-m thickness of the layer identified, e.g., from the seismic data. The corresponding remapped resistivity profile is shown overlaying the well-based resistivity data ("log ρ (well)") in FIG. 1 (the curve is not labelled in the figure). The curve representing this remapping of the CSEM profile agrees well with the well-log data.

This shows how in principle information regarding structural features in the subterranean strata can help to constrain resistivity profiles derived from CSEM surface data. This approach has been previously suggested [6, 7] as a means for in is effect improving the spatial resolution of CSEM-derived resistivity profiles. However, the present inventors have found that the problem of using structural information, e.g. from seismic surveying, to constrain CSEM data is not an easy one to solve reliably. This is because the problem is not in general uniquely solvable, and furthermore, once a solution has been determined, there is typically no ready measure of the likelihood of the solution being a good match for the subterranean strata (i.e., there is no confidence measure).

There is therefore a need for improved methods of processing CSEM data to derive subterranean resistivity profiles which take account of pre-existing structural information, e.g., from seismic surveying.

SUMMARY OF THE INVENTION

According to a first aspect of the invention there is provided a method of analysing controlled source electromagnetic (CSEM) survey data to determine probability density functions (PDFs) for values of an electromagnetic parameter at locations in a subterranean region of interest, the method comprising the steps of: (a) providing structural information for the subterranean region; (b) identifying structural features in the subterranean region based on the structural information; (c) assigning an initial probability density function (PDF) for values of the electromagnetic parameter in each of the structural features; (d) generating a plurality of subterranean models specifying a value for the electromagnetic parameter in each of the structural features, the models being obtained by statistical sampling of the respective PDFs; (e) identifying a subset of the subterranean models which are determined to meet an acceptance criterion; (f) changing the PDF for each structural feature based on a distribution of values for the electromagnetic parameter in the subset of subterranean models identified in step (e) so as to generate replacement PDFs for each of the structural features; and (g) iteratively performing steps (d), (e) and (f) a number of times so as to generate a final PDF for values of the electromagnetic parameter for each of the structural features identified in the subterranean region of interest, whereby the PDFs used in step (d) of one iteration are based on the replacement PDUs obtained in step (f) of a previous iteration.

Thus embodiments of the invention are able to provide statistically derived probability density functions for an electromagnetic parameter in a subterranean region of interest on a spatial scale that is comparable to that of the structural information, for example, structural information obtained from seismic surveying, or well-log data. The structural information will typically have a spatial resolution that is better than that derivable from the CSEM survey data using conventional processing techniques. Thus the spatial resolution of the CSEM survey data can in effect be enhanced by taking account of structural constraints provided by the structural information. Furthermore, by providing an approach that is based on PDFs for the electromagnetic parameter, both an estimate for the value of parameter, and an error estimate, can be provided. This enhances the value of the estimates in their subsequent interpretation.

The acceptance criterion may be based on any of, or combinations of, a number of different factors.

For example, the acceptance criterion for a subterranean model may depend on a measure of a difference between simulated CSEM survey results predicted for the subterranean model and CSEM survey results derived from the CSEM survey data. This can ensure models which are most consistent with the observed data have more chance of being accepted, and so contributing to the final PDFs.

The acceptance criterion may depend on a measure of a difference between the subterranean model and a baseline subterranean model. For example, the baseline model may be a model generated in a previous iteration which was identified as being the best-fitting model from that iteration, e.g., because it was the model meeting the acceptance criterion by the greatest margins. Alternatively, the baseline model could be defined by the expectation values for the PDFs from a previous iteration. Comparing current models with a baseline derived from a previous model(s) in this way can assist the PDFs in successive iterations to converge by ensuring models which differ significantly from the baseline model are less likely to be accepted.

The acceptance criterion may depend on how many iterations of steps (d), (e) and (f) have been previously performed. For example, early in the iteration process models may be more likely to be accepted than later in the process. This can help avoid the search for optimum PDFs from becoming "stuck" in a local minimum in the search space, while maintaining a reasonable likelihood of convergence towards the end of the iteration process.

The acceptance criterion may depend on a measure of a difference between the subterranean model and a subterranean model defined by expectation values for the initial PDFs. This can ensure models that depart significantly from what was considered a reasonable initial estimate are less likely to be accepted.

The acceptance criterion may depend on a measure of the variability in values of the electromagnetic parameter between different structural features in the subterranean model. For example, models showing a higher degrees of inter-layer so variability may be more likely to be accepted. This follows from an expectation that the region of interest might contains relatively small structures displaying relatively high anomalies in electromagnetic parameters compared to other structures (e.g., a high-resistivity thin layer corresponding to a hydrocarbon reservoir).

The replacement PDFs may generated by modifying the PDFs from a previous iteration in a maimer dependent on a distribution of values for the electromagnetic parameter in the set of subterranean models deemed to meet their respective acceptance criterion, for example, using Bayesiani techniques. Alternatively, the replacement PDFs may be based solely on the distribution of values for the electromagnetic parameter in the set of subterranean models for the various structures (i.e. independent of the previous PDFs).

The method may further comprise a step of determining an expectation value for the electromagnetic parameter in each of the structural layers from the final PDFs. This can be a primary product of the method for further processing/interpretation. The method may also comprise a step of determining a confidence estimate for the expectation value of the electromagnetic parameter in each of the structural layers from the final PDFs.

The number of times steps (d), (e) and (f) are iteratively performed may be predefined. Alternatively, the number of times may dependent on a measure of convergence of the PDFs, e.g., in at least one of the structural features, over a series of subsequent iterations.

The number of the plurality of models generated in step (d) in each iteration may predefined. Alternatively, the number of the plurality of models generated in step (d) may be variable. E.g., selected so that a predefined number of subterranean models deemed to meet the acceptance criterion in each iteration are obtained. For example, steps (d), (e), and (f) may be continuously performed in series for different models until a predefined number of models meeting their acceptance criterion is obtained.

The method may further comprise generating a displayable image from the final PDFs and displaying the image to a user.

The method may further comprise generating a geophysical survey report talking account of the final PDFs.

The initial PDFs and replacement PDFs may follow log-normal distributions. Modelling has shown these types of distribution provide robust and reliable results.

According to a second aspect of the invention there is provided a non-transient computer program product bearing machine executable instructions for implementing the method of the first aspect of the invention.

According to a third aspect of the invention there is provided a computer apparatus loaded with machine executable instructions for implementing the method of the first aspect of the invention.

According to a fourth aspect of the invention there is provided a method of monitoring a depletion of hydrocarbon from a reservoir in a subterranean region of interest, the method comprising: obtaining a first set of probability density functions (PDFs) for values of an electromagnetic parameter at locations in the subterranean region of interest by analysing CSEM survey data obtained at a first time according to the method of the first aspect of the invention; obtaining a second set of PDFs for values of the electromagnetic parameter at locations in the subterranean region of interest by analysing CSEM survey data obtained at a second time according to the method of the first aspect of the invention; and comparing the first and second sets of PDFs to identify changes in the hydrocarbon reservoir between the first and second times.

According to a fifth aspect of the invention there is provided a method of performing an electromagnetic survey of a subterranean region of interest, the method comprising: (a) obtaining controlled source electromagnetic (CSEM) survey data for the subterranean region; (b) providing structural information for the subterranean region; (c) identifying structural features in the subterranean region based on the structural information; (d) assigning an initial probability density function (PDF) for values of the electromagnetic parameter in each of the structural features; (e) generating a plurality of subterranean models specifying a value for the electromagnetic parameter in each of the structural features, the models being obtained by statistical sampling of the respective PDFs; (o identifying a subset of the subterranean models which are determined to meet an acceptance criterion; (g) changing the PDF for each structural feature based on a distribution of values for the electromagnetic parameter in the subset of subterranean models identified in step (e) so as to generate replacement PDFs for each of the structural features; and (h) iteratively performing steps (e), (f) and (g) a number of times so as to generate a final PDF for values of the electromagnetic parameter for each of the structural features identified in the subterranean region of interest, whereby the PDFs used in step (e) of one iteration are based on the replacement PDFs obtained in step (g) of a previous iteration.

According to a sixth aspect of the invention there is provided a method for obtaining hydrocarbon from a region of interest that contains a subterranean hydrocarbon reservoir, the method comprising: (a) providing controlled source electromagnetic (CSEM) survey data for the subterranean region; (b) providing structural information for the subterranean region; (c) identifying structural features in the subterranean region based on the structural information; (d) assigning an initial probability density function (PDF) for values of the electromagnetic parameter in each of the structural features; (e) generating a plurality of subterranean models specifying a value for the electromagnetic parameter in each of the structural features, the models being obtained by statistical sampling of the respective PDFs; (f) identifying a subset of the subterranean models which are determined to meet an acceptance criterion; (g) changing the PDF for each structural feature based on a distribution of values for the electromagnetic parameter in the subset of subterranean models identified in step (e) so as to generate replacement PDFs for each of the structural features; (h) iteratively performing steps (e), (f) and (g) a number of times so as to generate a final PDF for values of the electromagnetic parameter for each of the structural features identified in the subterranean region of interest, whereby the PDFs used in step (e) of one iteration are based on the replacement PDFs obtained in step (g) of a previous iteration; (i) identifying the hydrocarbon reservoir from the final PDFs; and (j) penetrating the identified hydrocarbon reservoir with a hydrocarbon-producing well.

According to a seventh aspect of the invention there is provided a volume of hydrocarbon, the hydrocarbon obtained by: (a) providing controlled source electromagnetic (CSEM) survey data for a subterranean region; (b) providing structural information for the subterranean region; (c) identifying structural features in the subterranean region based on the structural information; (d) assigning an initial probability density function (PDF) for values of the electromagnetic parameter in each of the structural features; (e) generating a plurality of subterranean models specifying a value for the electromagnetic parameter in each of the structural features, the models being obtained by statistical sampling of the respective PDFs; (f) identifying a subset of the subterranean models determined to meet an acceptance criterion; (g) changing the PDF for each structural feature based on a distribution of values for the electromagnetic parameter in the subset of subterranean models identified in step (e) so as to generate replacement PDFs for each of the structural features; (h) iteratively performing steps (e), (f) and (g) a number of times so as to generate a final PDF for values of the electromagnetic parameter for each of the structural features identified in the subterranean region of interest, whereby the PDFs used in step (e) of one iteration are based on the replacement PDFs obtained in step (g) of a previous iteration; (i) identifying the hydrocarbon reservoir from the final PDFs; (j) penetrating the identified hydrocarbon reservoir with a hydrocarbon-producing well; and (k) extracting the hydrocarbon from the reservoir using the well.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 2:
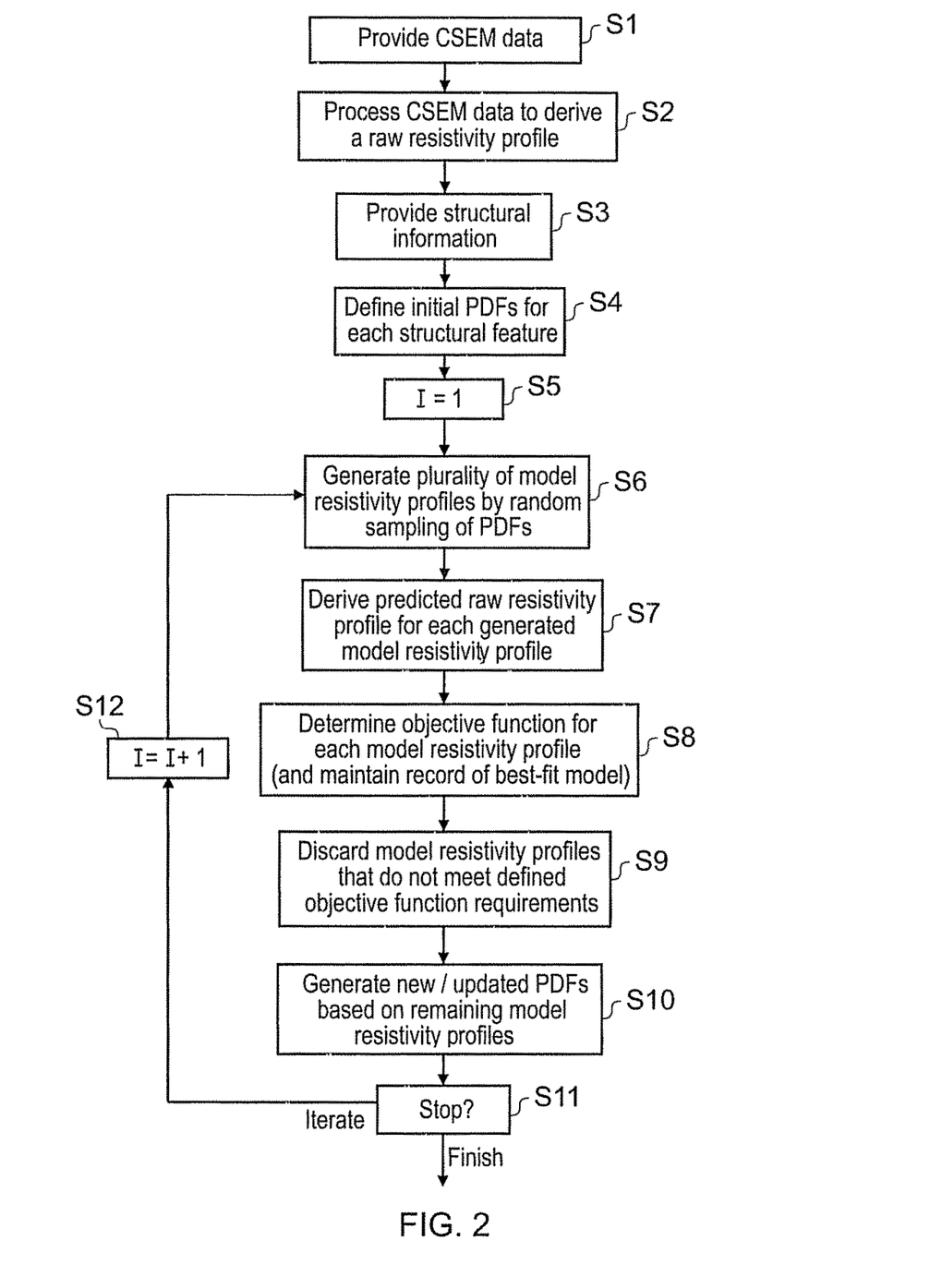
FIG. 2 is a flow chart schematically showing a method of processing CSEM survey data to obtain estimated probability density functions (PDFs) for an electromagnetic parameter at locations in a subterranean region of interest according to an embodiment of the invention.

FIG. 2 is a flow chart schematically showing a method of processing CSEM data obtained from an area of interest according to an embodiment of the invention. The process is an iterative one, and may in some respects be considered as a modification of a simulated-annealing algorithm [8]. For the purposes of this example it will be assumed that the CSEM data are obtained from the region of the Nuggets-1 gas field for which data are shown in FIG. 1.

In Step S1, CSEM data from a survey of the area of interest are obtained, or otherwise provided. Thus Step S1 may include performing a CSEM survey to obtain the data, or otherwise providing data from elsewhere, e.g., historical data from an earlier CSEM survey of the area. The data may be conventional CSEM data.

In Step S2, the CSEM data are processed in accordance with any known technique, e.g. an inversion technique, to derive a subterranean resistivity profile. This initial profile may be referred to here as the raw resistivity profile. The nature of the resistivity profile will depend on the study at hand. For example, in some cases a simple horizontally layered Earth may be considered an accurate representation of the subterranean strata so that a 1D model is considered sufficient to characterise the electrical properties of the substrata (i.e. resistivity varying in depth only). In other cases the resistivity profile may be 2D (resistivity varying in depth and one horizontal direction), or 3D (resistivity varying in all directions). Furthermore, the depth of the model represented by the resistivity profile will in general depend on the depth to which the data are considered sensitive. For the purposes of explanation, it will be assumed here that the processing aims to provide a 1D resistivity profile to a depth of 2500 m. Thus the raw resistivity profile obtained in Step S2 will represent a variation of resistivity with depth from the surface to 2500 m down. A portion of such a raw resistivity profile would correspond, for example, with the curve marked "log ρ (CSEM)" in FIG. 1.

In Step S3, structural information about the area of interest is obtained or otherwise provided. It is anticipated that in many embodiments the structural information will derive from conventional surface-based seismic surveying of the area of interest. The structural information may be used to divide the subterranean strata into what are considered structurally distinct features Thus for a 1D application, the structural information may be used to define structural layers in the subsurface. Conventional seismic processing techniques may be used to identify the different layers in accordance with known techniques. In this example, structural boundaries are identified by zero-crossings in the relative seismic impedance trace. Various other techniques could equally be used for identifying the layers. For this example based on the data shown in FIG. 1, 47 distinct structural layers are identified in a region from around depth D=1400 m to D=2500 are identified in Step S3, the layers being of varying thicknesses. One of the structural layers is defined by boundaries identified at depths of D=1685 m to D=1710 m. This layer corresponds with the gas-sand layer in the Nuggets-1 field.

In accordance with the processing set out in FIG. 2, it is assumed the resistivity throughout each of the identified structural layers is the constant, i.e., with any changes in resistivity occurring only at layer boundaries. However, the aim of the processing set out in FIG. 2 is not simply to provide an estimate of the resistivity in each layer Rather the processing set out in FIG. 2 aims to provide for each layer a probability density function (PDF) for the resistivity in each layer. This approach allows both an expected value for the resistivity in each layer to be derived and a measure of the statistical significance of the expected value (e.g., the variance of the PDF).

In Step S4 an initial "first guess" PDF for the resistivity in each identified structural layer in the substrata is defined. In this embodiment the same initial PDF is assumed for each layer, and furthermore there is no attempt to tune the PDFs according to the raw resistivity profile. In this example it is assumed that the resistivity PDFs all follow a log-normal distribution (i.e. a plot of $\log(\rho)$ vs $P(\rho)$ follows a normal distribution, where $\rho$ is resistivity and $P(\rho)$ is the probability for the resistivity). A log-normal variation is specified by an expectation value $E(\rho)$ and a variance $\sigma$. In this example the initial PDFs for each layer are defined by an expectation value $E(\rho)$ of 1.5 Ωm and a variance of 500 $(Ωm)^2$. The choice of a relatively low expectation value for each layer follows from the fact that brine saturated subterranean strata will typically have a low resistivity, typically on this order of magnitude. The large variance is chosen to ensure the PDFs provide for a reasonable probability of the resistivity values that might be encountered in the subterranean strata. In practice the method has been found to be acceptably robust to different choices of initial PDFs.

The PDFs for the different layers together provide a most-likely resistivity profile for the subterranean strata. This most-likely resistivity profile is defined by the expectation values $E(\rho)$ for the PDFs of the different layers. Thus the initially defined PDFs in this example correspond to an initial most-likely resistivity profile comprising a simple uniform subterranean strata configuration with a resistivity of 15 Ωm.

In Step S5, an iteration counter I is set to 1.

Step S6 is the beginning of an iterative part of the process. In Step S6 a plurality of model resistivity profiles are determined by random sampling from the PDFs in each layer. The random sampling may be made in accordance with known statistical techniques. Thus each model resistivity profile comprises a value of resistivity for each layer, the value having been randomly sampled from the PDF for that layer. In this example, it will be assumed that 2000 different models are generated in Step S6. The next few steps are directed to determining which of these 2000 models are to be accepted as reasonable, and which are to be discarded as unreasonable. As described further below, the models deemed acceptable will be used to define new PDFs for each layer for another iteration staring at Step S6. Significantly for this example, in subsequent iterations the test for whether a model is acceptable becomes more stringent, i.e., models are discarded more readily as the iteration counter I increases. This is why the process may be seen as a type of modified simulated annealing algorithm.

A primary consideration in deciding whether a model resistivity profile is acceptable is the extent to which the model is consistent with the observed data, i.e. whether the model would give rise the observed CSEM/subsequently derived raw resistivity profile. Thus in Step S7 a predicted raw resistivity profile is determined for each model resistivity profile generated in Step S6. A predicted raw resistivity profile is a model of what would be expected to be seen as a raw resistivity profile if the model at hand were to be an accurate representation of the Earth's true resistivity profile. The predicted raw resistivity profile may be determined by forward modelling a CSEM survey of subterranean strata based in the model to obtain predicted CSEM data, and then processing the predicted CSEM data for the model in the same way as the real data are processed in Step S2 to get a predicted raw resistivity profile for the model. In practice this can be computationally intensive and it has been found that appropriate predicted raw resistivity profiles for each model can be obtained more simply by in effect convolving the typical CSEM response function to a thin restive layer with the model. This can be achieved by smoothing the model resistivity profiles according to a blurring function to provide predicted raw resistivity profiles for each model. In this example the blurring function acts to provide a weighted average resistivity over layers spanning 270 meters, the weights being approximately parabolic so as to give most weight to values located near the centre of the moving window for the blurring function.

The determination of whether a given model is to be deemed acceptable is based on determining, in Step S8 described further below, an objective function $\Phi$ for each model. The objective function is designed to parameterise the "goodness of fit" of the model and the extent to which the model satisfies any other properties which are deemed desirable (e.g. smoothlines, or a lack thereof). In this example, there are three main contributions to the objective function.

A first term is a measure of a misfit between the predicted raw resistivity profile associated with the model at hand (as determined in Step S7) and the "real" raw resistivity profile derived in Step S2.

A second term is a measure of the extent to which the model deviates from the most-likely resistivity profile associated with the initially defined PDFs in Step S4. The principle here is that the initially defined PDFs should represent a reasonable assessment of the likely resistivity profile in the Earth, and so model resistivity profiles should be penalised (i.e. made less likely to be accepted) as they deviate further from this initially defined most-likely resistivity profile.

A third term is a measure of an inter-layer variability of the model, which might be termed an "entropy" of the model. This term is intended to penalise smooth models compared to models having higher inter-layer variability (entropy). The principle here is that subterranean strata, especially if they contain hydrocarbon layers/reservoirs, are likely to have relatively large inter-layer differences in resistivity, e.g. between a seawater-bearing layer and a hydrocarbon-bearing layer.

Thus the objective function $\Phi$ in this embodiment is defined as $\Phi = w_1\Phi_1 + w_2\Phi_2 + w_3\Phi_3$, where the three terms contributing to the sum correspond to the three terms described above, with $w_1$, $w_2$ and $w_3$ being weights chosen to control the relative importance of the different terms. Specifically, the first term (measure of a misfit between the predicted raw resistivity profile associated with the model and the "real" raw resistivity profile data derived in Step S2) is $$w_1\Phi_1 = w_1\Sigma|d_j - g_j(m)|,$$

where the sum is taken over all samples of the data, d, indexed by j, and $g_j(m)$ is the predicted resistivity from the model m.

The second term (measure of divergence from initial model) is $$w_2\Phi_2 = w_2\sqrt{\Sigma(\eta_j(m_j - m_j^{(0)}))^2},$$

where the sum is taken over all layers in the model, $m^{(0)}$ is the initial model, and $\eta$ constitutes a set of weights assigning a confidence level to each layer of the prior model. In this embodiment, $\eta$ was set to 1 for all but the last 5 layers, which had values tapering down to zero.

The third term ("entropy") is $$w_3\Phi_3 = w_3 \sum \frac{m_j}{s} \log\left(\frac{m_j}{s}\right)$$

where the sum is taken over all layers of the model and s is a scale factor, set to be the upper limit of permitted resistivities in any layer, here 1000 ohm meters.

The three weights in this example are $$w_1 = (\Sigma|d_j|)^{-1}$$

$$w_2 = (\Sigma(m_j^{(0)})^2)^{-1/2}$$

$$w_3 = 0.005$$

It will be appreciated that other formulations of objective function, e.g. with different terms, or with different relative weightings between terms could equally be used. For example, in some cases the objective function may be based solely on the misfit between the predicted resistivity profile for each model (i.e. the blurred model resistivity profile) and the observed raw resistivity profile. It will also be appreciated that such a misfit term could also be based on a different comparison. E.g. for each model resistivity profile generated at Step S6, predicted CSEM surface data could be determined by forward modelling a simulated CSEM survey for the model. A misfit term based on differences between the predicted CSEM surface data and the observed CSEM data provided in Step S1 could then be used for the objective function.

In this example a record is maintained of which model resistivity profile is associated with the "best" objective function so far, i.e. which model is associated with the lowest value of the objective function (or highest depending on how the function is parameterised). This model may be referred to as the best-fit resistivity profile. In subsequent iterations a model resistivity profile which is associated with a still better objective function replaces the best-fit model. Thus the pending best-fit resistivity profile when processing is complete is whichever of the model profiles generated randomly from the PDFs in the various iterations through Step S4 that is associated with the lowest objective function (assuming here, as is common, the objective function is defined such that the lower the objective function, the better the fit).

In Step S9, and for each of the models generated in Step S4, a decision is made about whether to keep or discard the model. For each model the decision is primarily based on the objective function $\Phi$ of the model. To do this a current baseline objective function $\Phi^E$ is defined. In this example, the baseline objective function is the objective function calculated for the best-fitting model identified in the previous iteration (in the first iteration the objective function for the first model generated is deemed the baseline objective function). Models are then kept or discarded probabilistically depending on their objective function $\Phi$, the current baseline objective function $\Phi^E$, and on what stage has been reached in the iterative process (i.e. the value of the iteration counter I)

In this example, any model having an objective function $\Phi$ which is better than, or equal to, the baseline objective function $\Phi^E$ is kept, regardless of the value of the iteration counter I.

Models having an objective function $\Phi$ which is worse than the baseline objected function $\Phi^E$ are kept or discarded probabilistically. Thus even if a generated model is considered less good that than the baseline model, there is still a non-zero probability that the model will be kept. The probability of keeping such a model depends in this example on the difference between $\Phi$ and $\Phi^E$ and the iteration counter I. The probability depends on I in such a way that models which are worse than the current baseline model by a given amount will have a better chance of being kept earlier in the iteration process (lower values of I). An advantage of this approach is that it helps prevent the optimisation process from settling into a local minimum of the objective function. It does this by allowing models that are worse (i.e. having higher objective functions) than the baseline model to nonetheless contribute to the further processing. This in particular is where the present embodiment bears some similarity to simulated annealing algorithms, whereby the iteration counter I may be seen as an inverse proxy for a state temperature T of the optimisation process ($T=I^{-1}$).

Thus the probability $AP(\Phi,\Phi^E,T)$ of a model being kept/accepted in this embodiment may be defined as follows:

$AP(\Phi,\Phi^E,T)=1$ for $\Phi \leq \Phi^E$ and $AP(\Phi,\Phi^E,T)=\exp(-(\Phi-\Phi^E)/T)$ for $\Phi > \Phi^E$.

Thus an acceptance probability AP ranging from 0 to 1 is obtained for each model. To determine if any given model is to be kept/accepted for further processing, a random number between 0 and 1 is determined, e.g. using a conventional random number generator algorithm. If the probability of acceptance AP for a model is greater than, or equal to, the corresponding random number, the model is kept. Otherwise the model is discarded. Of course in practice models having a probability of acceptance of 1 (i.e. models for which ($\Phi \leq \Phi^E$) can be directly accepted without first comparing their acceptance probability with a random number.

Thus Step S9 results in an identification of a subset of the models generated at Step S4 which are deemed acceptable for consideration during further processing of the data. The discarded models are no longer required.

In Step S10, new PDFs are determined for each layer in the subterranean strata. The new PDFs for each layer are statistically based on the range of resistivities seen for that layer in the different models generated in Step S6 that were not discarded in Step S9. In this example the assumption that the PDFs follow a log-normal distribution is maintained. Thus in one example the new PDFs for each layer may be obtained by fitting a log-normal distribution to the range of resistivities seen for that layer in the model resistivity profiles that are kept at Step S9, e.g., in accordance with conventional statistical fitting algorithms. In this example, however, the new PDFs in each layer are provided by way of an update to the existing PDFs, the update being based on the range of resistivities seen for the respective layers in the different accepted models. This may again be done using conventional statistical tools for amending a statistical distribution (i.e. a PDF) to take account of "new" data (i.e. the resistivities for the accepted model resistivity profiles). In this example conventional Bayesian techniques are employed. Specifically, Bayes theorem may be written as $$P(A \mid B) = \frac{P(B \mid A)P(B)}{P(A)}$$

where $P(X|Y)$ is the conditional probability of X given Y. We take A to be the set of data generated throughout the iterations at the current temperature (iteration), and B to be the new model. Thus $P(B|A)$ is derived from the misfit, and $P(B)$ is the probability distribution derived at the previous temperature. We assume that all physically possible models are equally likely, and therefore $P(A)$ is uniform over the range of permitted values. In other embodiments we might include prior assumptions about the model in the form of $P(A)$. The conditional probability, $P(A|B)$, is therefore the new estimate of the PDF.

Thus Step S10 results in a new/updated PDF for each layer. The PDFs have an associated expectation value $E(\rho)$ and a variance $\sigma$.

In Step S11 a decision is made about whether the current PDFs are to be taken as the final PDFs representing a best estimate for the resistivity in the various layers, or whether further iterations are required.

If further iterations are required, processing follows the "iterate" branch from Step S11, through Step S12 where the iteration counter I is incremented by 1, and back to Step S6. Processing proceeds from Step S6 as described above, with the plurality of models generated in Step S6 in each further iteration being based on sampling of the updated/new PDFs derived in Step S10 of the previous iteration. This iterative loop through Steps S6 to S12 continues until it is decided in Step S11 that no further iterations are required.

There are various ways in which the decision to stop iterating in Step S12 could be made. For example, the process may be configured to iterate for a fixed number of iterations, e.g. stopping when the iteration counter I reaches, say, 2000. Alternatively, the decision to stop may be based on the extent to which the PDFs are evolving. For example, it may be decided that iterations should continue until the PDFs derived in a given number of subsequent iterations, e.g. 10, are sufficiently similar to one another that the process may be considered to have converged on a final result. Various other schemes may be used to determine when to stop in accordance with conventional techniques for assessing whether an iterative process has converged.

Once it is decided in Step S11 that iterations should stop, the current PDFs (i.e. those derived in the immediately preceding Step S10) may be to be taken as a final output from the processing. That is to say, the current PDFs may be taken to represent the best estimate of a resistivity profile for the subterranean strata which is consistent with the observed CSEM data, and which is also constrained by structural information provided, e.g. from seismic surveying, for the region of interest. A final result of the processing may thus be seen as a final resistivity profile comprising an expected resistivity value for each structural layer identified in step S3, which is based on the respective expectation values $E(\rho)$ of the final PDFs, along with a confidence estimate for each layer, which is based on the respective variances a of the final PDFs. That is to say, a final result for each layer may be taken to be $\rho=E(\rho)+/-\sigma$.

The above-described approach thus shows how structural information can be used to remap a raw resistivity profile derived from CSEM data (having relatively poor spatial resolution) to series of resistivity values associated with discrete structural features identified, e.g. from seismic data, in the region of interest. Furthermore, not only does the approach in effect enhance the spatial resolution of the CSEM data (by mapping it to the higher spatial resolution structural information), it does so while also providing a measure of statistical confidence in the result for each layer. By ascribing statistically derived "error bars" to the resistivity estimates in each layer, the value of the estimates for the purposes of further interpretation of the CSEM data is greatly enhanced.

It will be appreciated that the processing shown in FIG. 2 is only one example of an approach based on PDFs, and the approach may be modified to provide other examples of broadly similar techniques. For example, in other embodiments the steps may be performed in a different order, e.g. Step S3 could be performed before Step S1. Also the specific manner in which the processing is performed may be modified. For example, in the embodiment represented in FIG. 2, a fixed number of model profiles are generated in Step S6, and these are processed in parallel through Steps S7, S8 and S9. In another example, the combined processing of these steps may be performed serially on one model at a time. That is to say within each iteration defined by the iteration counter I, the processing may loop through steps S6 to S9 dealing with one model resistivity profile at a time. This might be done a fixed number of times, e.g. 2000 times, which would provide a subset of accepted models for consideration in Step S10. Alternatively, the loop through Steps S6 to S9 may be performed until a fixed number of accepted models have been obtained, e.g. 2000 accepted models. This approach can ensure that a constant and statistically significant number of accepted models for use in Step S10 is obtained in each iteration.

Having explained the principles underlying an embodiment of the invention, an example of an application of the embodiment to "real" data will now be described. In particular, the processing will be applied to data from the Nuggets-1 gas field (i.e. corresponding to the data shown in FIG. 1). As discussed above, the subterranean structure in this region is known from well log data to contain a high resistivity gas-sand layer at a depth of around 1700 m.

Thus the right hand trace of FIG. 1 (curve marked "log $\rho$ (CSEM)") corresponds with the conventionally derived CSEM raw resistivity profile referred to in Step S2 of the method shown in FIG. 2.

In the example application of the invention described here, the structural information (see Step S3 of FIG. 2) is derived from surface seismic data. Thus based on seismic depth profiles similar to that shown in FIG. 1 (curve marked "RI (Seismic)"), a plurality of discrete structural layers are identified in the region of interest. In this example, the seismic data reveal 47 layers from a depth of around D=1400 m to D=2500 m. The layers have typical thicknesses of around 20 m to 25 m, with the thinnest and thickest layers being below 10 m and over 40 m in thickness respectively.

Figure 3:
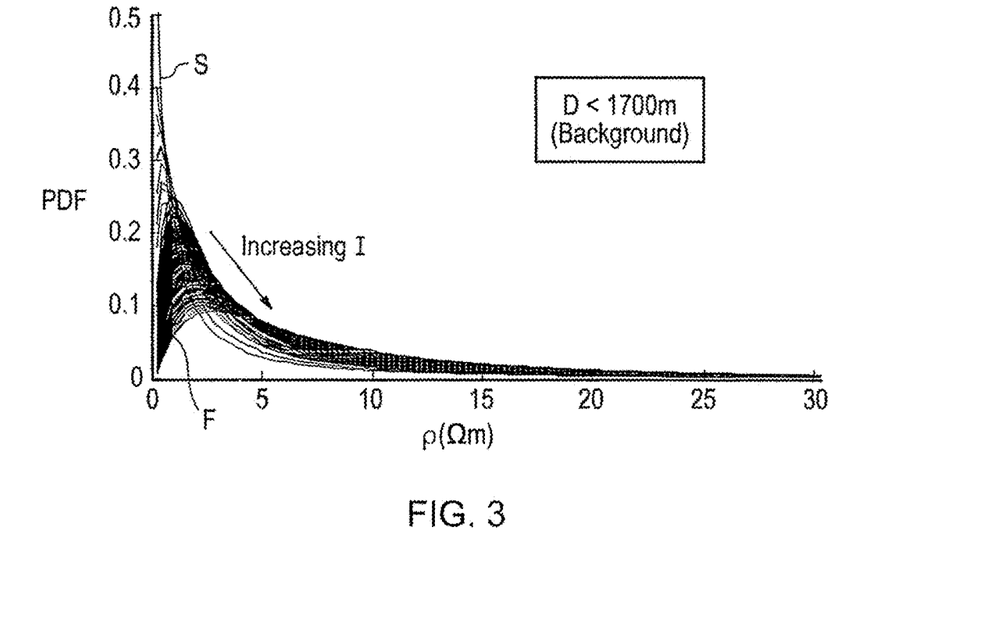
FIGS. 3 and 4 are graphs schematically showing how PDFs obtained in accordance with the processing set out in FIG. 2 evolve during the processing at two is different locations in the subterranean region of interest.
Figure 4:
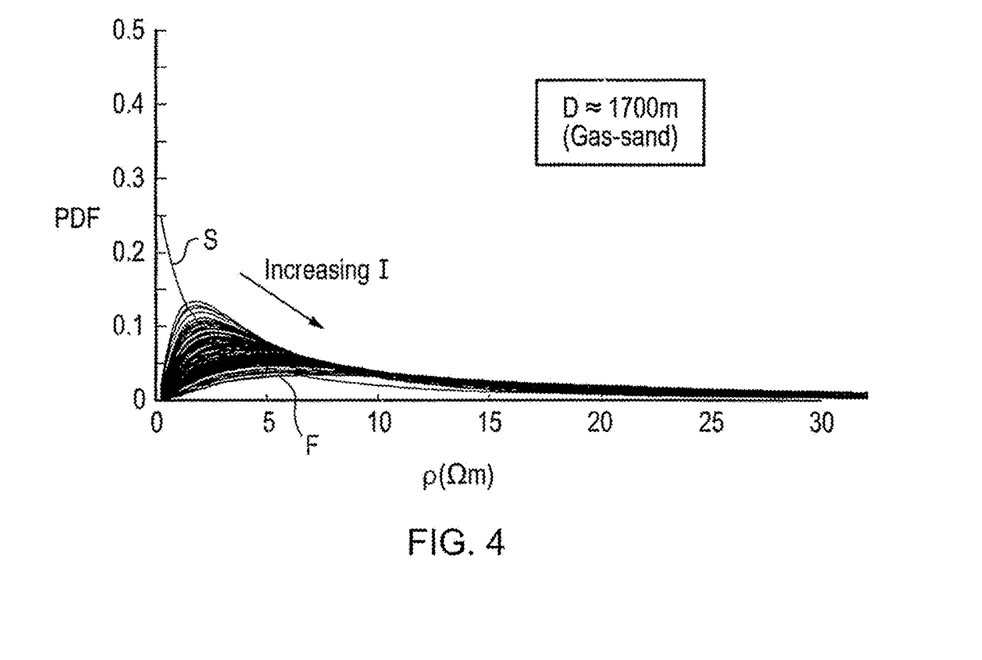

FIG. 3 is a graph schematically showing how PDFs calculated in accordance with the processing set out in FIG. 2 evolve during the above-described iterative process for one of the identified structural layers in the subsurface strata. The example data are shown for a layer at a depth of around D=1630 m. Thus a series of curves of probability density versus resistivity $\rho$ are shown corresponding to the PDF derived in every 20th iteration through the process set out in FIG. 2. The PDF marked "S" corresponds to the "zeroth" iteration, i.e. the initially specified PDF in Step S4. The curve marked "F" corresponds to the PDF from the final iteration. The curves evolve from S to F along the direction schematically indicated by the arrow identifying the direction for increasing iteration counter I (equivalent to decreasing temperature/cooling in the simulated annealing analogy). That is to say, the PDFs evolve such that the maximum probability seen in the curves gets smaller with increasing iteration counter I. It is apparent from FIG. 3 that the most likely resistivity for this layer (i.e. the maximum in the PDF) remains relatively low, staying below 5 $\Omega$m throughout the iteration process. The final PDF in this layer is associated with an estimated resistivity (defined as $E(\rho)$ and a range for the final PDF derived from the variance) of 6 $\Omega$m, range 0.5-28 $\Omega$m. This corresponds with the known resistivity for this layer from the well log data, which has a mean of 1 $\Omega$m and a range 0.9-1.1 $\Omega$m FIG. 4 is similar to, and will be understood, from FIG. 3, but FIG. 4 shows data for a structural layer identified at around D=1700 m (which is known from the well log data to correspond with the gas-sand layer). Again the initial and final PDFs are marked "S" and "F" respectively in FIG. 4. The evolution of the PDF in FIG. 4 is noticeably different from the PDF evolution seen in FIG. 3. In particular, the peak in the PDFs is seen to move to significantly higher resistivities as the iteration proceeds. This is consistent with what might be expected for the higher resistivity gas-sand layer. This shows how the process described above can identify a structural layer corresponding to a high resistivity reservoir on spatial scale that is better than that of a raw resistivity profile initially derived from the CSEM data.

Figure 5:
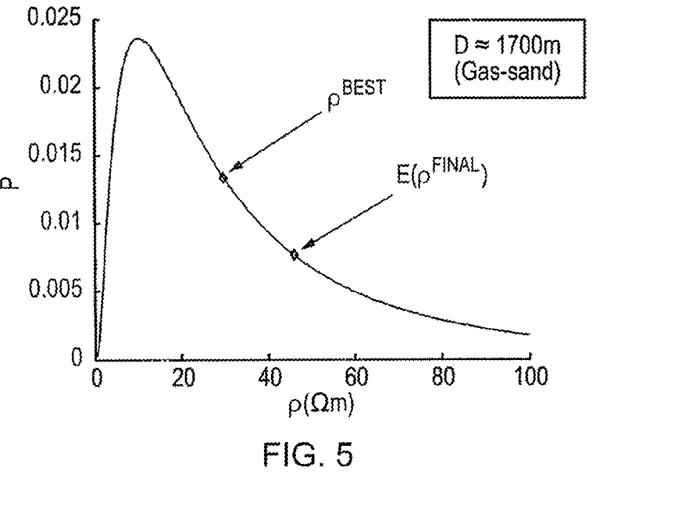
FIG. 5 is a graph schematically showing an estimated PDF for an electromagnetic parameter in a subterranean region of interest obtained according to an embodiment of the invention.

FIG. 5 is a graph plotting the final PDF shown in FIG. 4 on a magnified vertical scale and over a greater range of resistivities. The final PDF in this layer is associated with a final estimated resistivity (defined as $E(\rho)$ and range for the final PDF) of around 45 $\Omega$m, range 15-82 $\Omega$m. The resistivity expectation value for the final PDF is identified in the figure by a point on the curve labelled "$E(\rho^{FINAL})$". The value corresponds reasonably well with the average resistivity for this structural layer seen in the well log data which is 103 $\Omega$m, range 0.8-933 $\Omega$m It is, however, noted that the estimated resistivity is slightly less than the actual resistivity in the gas-sand layer identified from the well-log resistivity data. This is because the thickness of the high resistivity zone in the gas-sand layer is in reality less than the structural layer identified from the seismic data. Thus in mapping the resistivity to a structural layer that is thicker than the thickness of the "real" resistivity increase associated with the gas-sand layer, a lower resistivity estimate is obtained. This is because, as noted above, CSEM methods are primarily sensitive to transverse resistance of structures, i.e. in this case the resistivity-thickness product for the layers. Nonetheless, it is clear that the approach described above provides a better estimate of the resistivity in the gas-sand layer that that seen from the raw inverted CSEM data.

Also marked on the curve shown in FIG. 5 is a point labelled "$\rho^{BEST}$" at a resistivity of around 30 $\Omega$m. This corresponds with the resistivity for the structural layer in the gas-sand region in what was identified in the iteration process as the best-fit model, i.e. the model generated during the iteration process that had the best objective function. This demonstrates how the expectation value of the final PDF for this layer (i.e. around 45 Ωm) provides a better match to the well-log data than the resistivity in this layer for the best-fitting model seen during the whole iteration process (around 30 Ωm). This is significant as conventional analysis approaches would be encouraged to converge on this model because of its nominally optimal objective function. What is more, conventional analysis approaches would not be able to provide any estimate as to the statistical confidence in the model.

Thus the approach of embodiments of the invention is powerful in being able to converge on a probability density function for resistivity values in each identified structural feature. The probability density functions provide both an expectation value and a variance for the resistivity, and furthermore are robust to the presence of "fluke" minima in the objective function which are not always reliable matches for the true subterranean resistivity.

Figure 6:
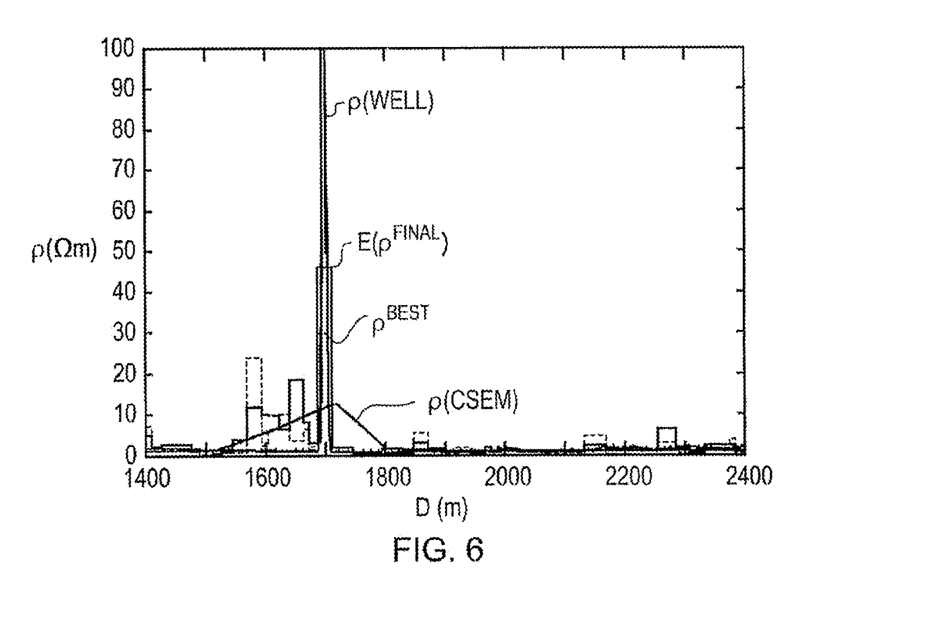
FIG. 6 is a graph schematically showing various estimated resistivity profiles as a function of depth in a region of a well-log in the Nuggets-1 gas field.

FIG. 6 is a graph plotting various resistivity profiles as a function of depth from 1400 m to 2400 m in the region of the well-log in the Nuggets-1 gas field discussed above. Four curves are shown.

A first curve is marked "ρ (well)" and plots the resistivity determined from well log data. (This curve can be identified throughout out the plot as the most jagged of the curves). This well-log curve in essence plots the same data as is shown in FIG. 1 for the curve labelled "log ρ (well)", except the axes have been switched, and it is resistivity, as opposed to logarithm of resistivity, that is plotted. The presence of the high-resistivity and relatively thin gas-sand layer at around D=1700 m is clear. Peak resistivity here exceeds 100 Ωm.

A second curve is marked "ρ (CSEM)" and plots resistivity as determined using conventional surface CSEM survey techniques. (This curve can be identified throughout out the plot as generally being the smoothest of the curves). This raw CSEM curve in essence plots the same data as is shown in FIG. 1 for the curve labelled "log ρ (CSEM)", except again the axes have been switched, and it is resistivity, rather than logarithm of resistivity, that is plotted. The curve again shows how the increase in resistivity associated with the gas-sand layer (at around D=1700 m) in the CSEM data is spread over a much broader range of the depths because of the typically relatively poor spatial resolution of CSEM data. The curve here peaks at approximately the correct location for the gas-sand layer, but with a resistivity of only around 10 Ωm or so.

A third curve is marked "$E(\rho^{FINAL})$" (this curve can be identified throughout out the plot as the solid-line blocky curve). This curve plots resistivity determined in accordance with an embodiment of the invention. Thus the curve plots the expectation value of the respective final PDFs for each of the separately identified structural layers in the subterranean strata. The curve shows a peak in resistivity in a layer at around 1700 m, the peak having a value of around 45 Ωm as noted above. This peak corresponds well with the true location of the peak in resistivity as seen in the well-log data. The curve also shows good correspondence with the well-log data in other layers, apart from in some of the layers just above the gas-sand layer. Here the curve shows some layers having anomalously high resistivity. This is thought to be a consequence of the asymmetric nature of the resistivity anomaly seen in the inverted CSEM data (i.e. in the curve marked "ρ (CSEM)"). Nonetheless, it is still clear that the overall curve matches the well-log data better that the curve derived by a raw inversion of the CSEM data using conventional CSEM processing techniques. This demonstrates the value of using structural information from seismic layers to constrain the CSEM data.

A fourth curve is marked "$\rho^{BEST}$" in FIG. 6. (This curve can be identified throughout out the plot as the dotted-line blocky curve). This curve shows the resistivity in each identified structural layer for the for best-fitting of all the models arising in the iterative process of deriving the PDFs. That is to say, the curve corresponds with the model generated during the iteration process that had the best objective function. The curve shows a peak in resistivity in a layer at around 1700 m (with a peak value of around 30 Ωm as noted above for this layer). The peak location corresponds reasonably well with the location of the peak in the well-log data. The curve also shows a reasonably good correspondence with the well-log data in other layers. However, as with the curve derived from final PDFs, the best-fit curve also displays anomalous resistivity estimates in layers just above the gas-sand layer. The greatest anomaly in the best-fit model (at around 1600 m) is higher than the greatest anomaly seen for the PDF-based resistivities. In general, the resistivity profile based on the expectation values of the PDFs derived in the above described iterative process are seen to provide a better overall match to the well-log data.

Figure 7:
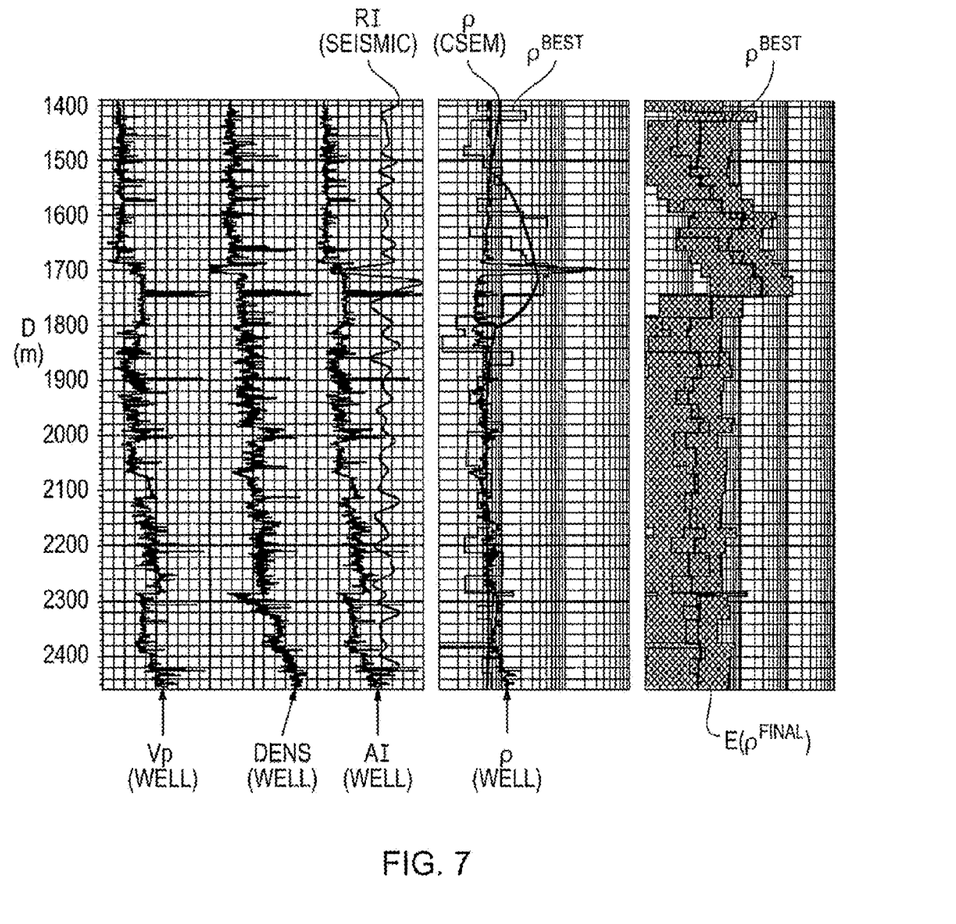
FIG. 7 schematically shows profiles for a number of geophysical properties obtained using well-log data, surface-based seismic techniques, and surface-based CSEM techniques, and results obtained by analysing CSEM survey data according to an embodiment of the invention.

FIG. 7 schematically shows profiles for a number of geophysical properties is obtained using well-log data and surface-based seismic and CSEM technique. The data are again from the same region in the Nuggets-1 gas field as discussed above.

The curves marked "AI (well)", "RI (seismic)", "ρ (well)" and "ρ (CSEM)" plot the same data as, and will be understood, from the curves marked "AI (well)", "RI (seismic)", "log ρ (well)" and "log ρ (CSEM)" respectively in FIG. 1. The only differences are that data plotted in FIG. 7 span a greater depth range (around 1400 m to around 2450 m), and the resistivity curves in FIG. 7 plot resistivity on a logarithmic scale, rather than logarithm of resistivity on a linear scale.

The plots in FIG. 7 are shown in three panels. The left-hand panel includes the curves "AI (well)" and "RI (seismic)". In addition, this panel shows two further curves marked "$V_p$ (well)" and "DENS (well)". These curves respectively plot acoustic velocity and the mass density as a function of depth as derived from well-log data. The gas-sand layer is particularly apparent in the mass density curve as a region of lower density around 1700 m.

The central panel in FIG. 7 shows the curves "ρ (well)" and "ρ (CSEM)" (the curve marked "ρ (well)" is the more jagged curve, with "ρ (CSEM)" being the smoother curve). In addition a curve marked "$\rho^{BEST}$" is shown (this is the more blocky curve). This curve corresponds with the curve marked "$\rho^{BEST}$" in FIG. 6, but plotted in FIG. 7 with the axes switched and with resistivity shown on a logarithmic scale.

The right-hand panel shows a curve marked "$E(\rho^{FINAL})$". This is the curve shown in heavy line. The curve corresponds with the curve marked "$E(\rho^{FINAL})$" in FIG. 6, but plotted in FIG. 7 with axes switched and with resistivity shown on a logarithmic scale. However, in addition to re-plotting the expectation values of the final PDFs as shown in FIG. 6, the right-hand panel of FIG. 7 also shows the variances of the various PDFs in each layer. These are shown as a cross-hatched region spanning +/−1σ about the respective expectation values in each layer. Also shown in the right-hand panel of FIG. 7 is a duplication of the curve marked "$\rho^{BEST}$" in the central panel. This to allow for easy comparison between the curves.

Thus FIG. 7 again shows how the expectation values for PDFs derived in accordance with an embodiment of the invention can provide for a determined resistivity profile which better corresponds with well-log data than conventionally processed CSEM data. FIG. 7 also shows how statistically derived confidence estimates/error bars may be provided. As will be appreciated, the ability to provide error estimates is a great help for subsequent processing and interpretation of the CSEM data since it allows uncertainties in results to be properly quantified.

Thus not only are resistivity profiles derived from CSEM data in accordance with embodiments of the invention likely to better represent the true resistivity profile of the Earth compared to conventionally derived resistivity profiles, profiles derived according to embodiments of the invention are also inherently more valuable as interpretational tools since they may be provided with statistically derived confidence estimates.

Figure 8:
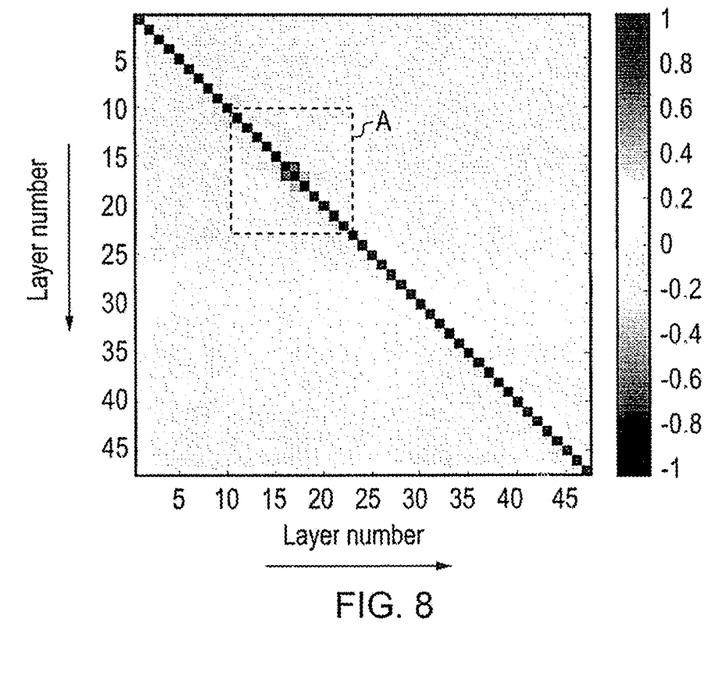
FIGS. 8 and 9 schematically represents correlation matrices for PDFs obtained for different structural features in a subterranean region of interest by analysing CSEM data according to an embodiment of the invention.

FIG. 8 schematically represents a correlation matrix for the final PDFs derived for the different subterranean structural layers in the above-described analysis of data from the Nuggets-1 field. Layers are numbered starting from 1 at the seafloor and increasing downwards to layer number 47. Thus the square at the bottom-left corner of FIG. 8 represents the correlation between the final PDF in layer 1 and the final PDF in layer 47. The colour bar to the right of the figure shows the scale. The main diagonal starting from the top-left of the figure thus plots the self correlation for each layer, which in each case is of course unity. The plot is mirrored about this diagonal since the correlation of layer X with layer Y is the same as the correlation between layer Y and layer X FIG. 8 shows there is generally close to zero correlation between most of the layers.

Figure 9:
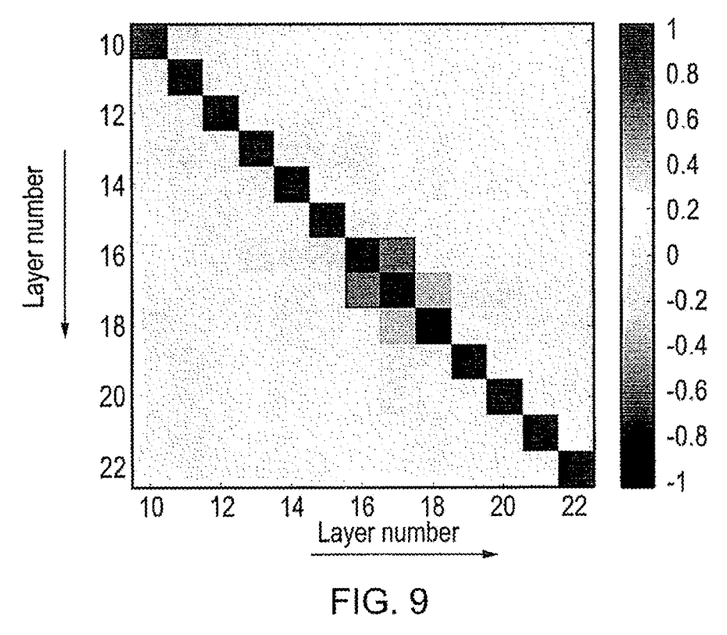

FIG. 9 is similar to and will be understood from FIG. 8, but shows a section of FIG. 8 on a larger scale. In particular FIG. 9 shows the section of FIG. 8 bound by the box marked "A". Thus FIG. 9 plots the cross-correlation matrix for layers 10 to 22. For the layer numbering used here, the gas-sand layer in the Nuggets-1 field is in layer number 16. Again FIG. 9 shows a diagonal of unity correlation corresponding to the self-correlations for each of the layers, and close to zero correlation for most other inter-layer correlations. However, it may be noted that the cross-correlation between layers 16 and 17 is not close to zero, but has a value of around −0.6. There is thus a relatively strong negative correlation between these two layers. This negative correlation explains why the inversion process underestimates the resistivity of the gas sand in layer 16. It can be seen from FIG. 7 that layer 17, which is immediately beneath the gas-sand layer, is also attributed a relatively high resistivity in the final inversion. This indicates that if the resistivity in layer 17 were decreased, and the resistivity in the layer 16 were increased proportionately, the effects on surface CSEM data would tend to cancel out. In effect this reduces the extent to which the resistivities in these two layers can be independently determined. This means the gas-sand layer may not be completely resolved at the spatial resolution provided by the structural features identified from the seismic constraints. Thus in practice for this example, the effective spatial resolution of the CSEM data processed in accordance with an embodiment of the invention will typically be around two of seismic layers in resolution, i.e. about 40 m in this example. However, this is still much better than the 250-m or so spatial resolution seen with conventional structurally unconstrained CSEM data processing.

Resistivity profiles obtained in accordance with embodiments of the invention may be further processed/interpreted in accordance with conventional CSEM data processing/interpretation techniques. For example, a displayable image may be generated based on the derived resistivity profile and/or confidence estimates for display to a user, or the resistivity profiles and/or confidence estimates may be used as inputs for further processing. Similarly, a geophysical report, e.g. in a printed document, which is based at least in part on the results of processing in accordance with embodiments of the invention may be provided.

What is more, while the above has focussed on resistivity, it will be appreciated that the invention is equally applicable to deriving values for other electromagnetic parameters, e.g., conductivity (inverse of resistivity), or measurements of anisotropy in resistivity or conductivity, for example.

Figure 10:
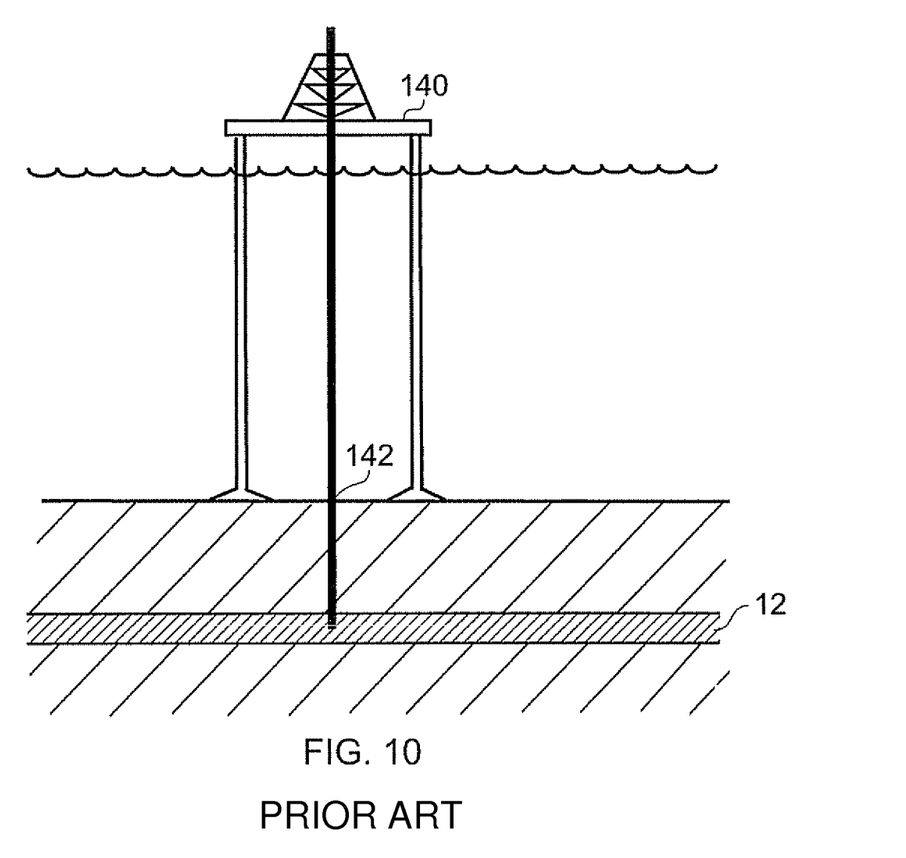
FIG. 10 is a schematic view of an oil rig producing hydrocarbon according to an embodiment of the invention.

FIG. 10 is a schematic view of an oil rig 140 producing hydrocarbon according to an embodiment of the invention. The oil rig is located in the vicinity of a region of interest which has been CSEM surveyed Here an analysis of the data obtained during the survey in accordance with the above-described techniques has identified a subterranean hydrocarbon reservoir 12 within the region of interest. The identified hydrocarbon reservoir has been penetrated by a hydrocarbon-producing well 142 carried by the oil rig 140. Hydrocarbon (e.g. oil) may be produced from the well 142 (i.e. extracted/recovered from the reservoir 12) using conventional techniques.

Figure 11:
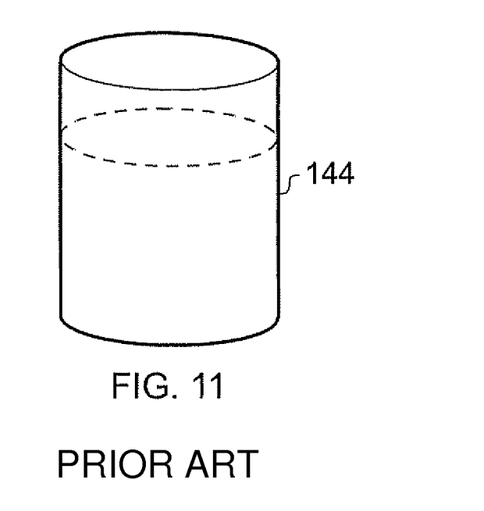
FIG. 11 is a schematic perspective view of a barrel containing a volume of hydrocarbon according to an embodiment of the invention.

FIG. 11 is a schematic perspective view of a barrel containing a volume of hydrocarbon 144 according to an embodiment of the invention. The hydrocarbon is produced using the well 142 shown in FIG. 10.

It will be appreciated that while the above description has focussed on application to a 1D model (resistivity solely varying with depth), this is for ease of explanation only. Embodiments of the invention are equally applicable to higher dimensional models, e.g., 2D, 2.5D and 3D. For example, in a 2D application, a 2D model of the subterranean strata, e.g. derived from seismic surveying, may be used to define structurally distinct regions in the subterranean strata, and the above described scheme for deriving probability density functions for resistivity within the layers of a 1D model could similarly be used for deriving probability density functions for resistivity in each of the different structural regions of the 2D model. In these cases a 2D forward model may be used to determine the "predicted" CSEM data for each model from which the objective function misfit may be calculated.

Other stochastic optimisation algorithms could be used to derive probability density functions for resistivity within the structural layers identified by the structural information. For example, instead of the above-described modified form of a type of simulated annealing algorithm, Monte Carlo-Markov chain sampling or genetic algorithms could be used.

It will be understood that the CSEM survey data may be conventional CSEM data obtained from a towed source (transmitter) and/or towed receivers. Furthermore, the CSEM survey data may be any form of electromagnetic data, e.g. strengths and/or phases of electric and/or magnetic field data. Embodiments of the invention may also be applied to CSEM data obtained in a fixed installation. For example, the method could be used to monitor changes to a hydrocarbon reservoir from which hydrocarbon is being drawn. In such cases it may be appropriate to employ one (or more) source(s) in fixed positions relative to a receiver array rather than undertake frequent towed surveys to provide the CSEM data for analysis. The source(s) could be anchored to the seafloor or suspended from an oil-rig platform, for example. In other examples, the source(s) could be placed in a well or borehole, e.g. a geotechnical borehole. Furthermore, in a monitoring application, the layer identification may be based on structural information provided by analysis of well log data in the region of interest (or interpolated from well-log data from outside the region of interest), instead of, or as well as, using surface seismic data to identify what are to be deemed to be distinct structural features in the subterranean strata.

Finally, it will be understood that the invention is equally applicable to surveying of freshwater, for example large lakes or estuaries, so that references to seafloor, seawater etc. should not be regarded as limiting and should be interpreted as covering lakebed, riverbed etc.

REFERENCES

[1] GB 2 382 875 (University of Southampton).
[2] GB 2 411 006 (OHM Limited)
[3] GB 2 423 370 (OHM Limited)
[4] Constable, S. C. & Weiss, C., *Mapping Thin Resistors And Hydrocarbons With Marine EM Methods: Insights From 1-d Modelling*, Geophysics, volume 71, issue 2, pp. 43-51, March 2006
[5] MacGregor, L., & Sinha, M., *Use of Marine CSEM for Sub-Basalt Exploration*, Geophysical Prospecting, volume 48, pp 1091-1106
[6] MacGregor, L., Andreis, D., Tomlinson, J., & Barker, N., *Controlled-source electromagnetic imaging of the Nuggets-1 reservoir*, The Leading Edge, August 2006
[7] Harris, P., & MacGregor, L., *Determination of reservoir properties from the integration of CSEM and seismic data*, First Break, November 2006
[8] Kirkpatrick, S., Gelatt, C., & Vecchi, M., *Optimization by Simulated Annealing*, Science, volume 220, number 4598, pp. 671-680, May 1983

The invention claimed is:

1. A method of analysing controlled source electromagnetic (CSEM) survey data to determine probability density functions (PDFs) for values of an electromagnetic parameter at locations in a subterranean region of interest, the method comprising the steps of:
   (a) providing structural information for the subterranean region;
   (b) identifying structural features in the subterranean region based on the structural information;
   (c) assigning an initial probability density function (PDF) for values of the electromagnetic parameter in each of the structural features;
   (d) generating on a computer apparatus a plurality of subterranean models specifying a value for the electromagnetic parameter in each of the structural features by statistical sampling of the respective PDFs;
   (e) identifying a subset of the subterranean models which are determined to meet an acceptance criterion;
   (f) generating replacement PDFs for each structural feature based on a distribution of the values for the electromagnetic parameter in the subset of subterranean models identified in step (e); and
   (g) iteratively performing steps (d), (e) and (f) a number of times so as to obtain a final PDF for values of the electromagnetic parameter for each of the structural features identified in the subterranean region of interest, whereby the PDFs used in step (d) of one iteration are based on the replacement PDFs generated in step (f) of a previous iteration.

2. A method according to claim 1, wherein the acceptance criterion for a subterranean model depends on a measure of a difference between simulated CSEM survey results predicted for the subterranean model and CSEM survey results derived from the CSEM survey data.

3. A method according to claim 1, wherein the acceptance criterion for a subterranean model depends on a measure of a difference between the subterranean model and a baseline model.

4. A method according to claim 3, wherein the baseline model is a model generated in a previous iteration identified as being a best-fitting model from that iteration.

5. A method according to claim 1, wherein the acceptance criterion for a subterranean model depends on how many iterations of steps (d), (e) and (f) have been previously performed.

6. A method according to claim 1, wherein the acceptance criterion for a subterranean model depends on a measure of a difference between the subterranean model and a subterranean model defined by expectation values for the initial PDFs.

7. A method according to claim 1, wherein the acceptance criterion for a subterranean model depends on a measure of the variability in values of the electromagnetic parameter between different structural features in the subterranean model.

8. A method according to claim 1, wherein the replacement PDFs are generated by modifying the PDFs from a previous iteration in a manner dependent on a distribution of values for the electromagnetic parameter in the subset of subterranean models deemed to meet their respective acceptance criterion.

9. A method according to claim 1, further comprising a step of determining an expectation value for the electromagnetic parameter in each of the structural features from the final PDFs.

10. A method according to claim 9, further comprising a step of determining a confidence estimate for the expectation value of the electromagnetic parameter in each of the structural features from the final PDFs.

11. A method according to claim 1, further comprising a step of deriving a displayable image based on the final PDFs and displaying the image to a user.

12. A method according to claim 1, wherein the initial PDFs follow log-normal distributions.

13. A method according to claim 1, wherein the replacement PDFs follow log-normal distributions.

14. A method according to claim 1, wherein the structural information for the subterranean region comprises data from seismic surveying of the region of interest.

15. A method according to claim 1, wherein the structural information for the subterranean region comprises well-log data for the region of interest.

16. A method according to claim 1, wherein the number of times steps (d), (e) and (f) are iteratively performed is predefined.

17. A method according to claim 1, wherein the number of times steps (d), (e) and (f) are iteratively performed is dependent on a measure of a convergence of the PDFs in at least one of the structural features over a number of iterations.

18. A method according to claim 1, wherein the number of the plurality of models generated in step (d) in each iteration is predefined.

19. A method according to claim 1, wherein the number of the plurality of models generated in step (d) is variable and selected so as to provide a predefined number of subterranean models which are deemed to meet the acceptance criterion in each iteration.

20. A method according to claim 1, wherein the number of times steps (d), (e) and (f) are iteratively performed is dependent on a measure of a convergence of the PDFs in each structural features for a series of subsequent iterations, such that a predefined number of subterranean models deemed to meet the acceptance criterion are obtained.

21. A method according to claim 1, wherein the electromagnetic parameter is resistivity.

* * * * *